United States Patent [19]

Guginsky

[11] Patent Number: 6,106,031
[45] Date of Patent: *Aug. 22, 2000

[54] ELECTRICAL FITTING FOR CONDUIT CONNECTION

[76] Inventor: Frank Guginsky, 23 Partridge Dr., Commack, N.Y. 11725

[*] Notice: This patent issued on a continued prosecution application filed under 37 CFR 1.53(d), and is subject to the twenty year patent term provisions of 35 U.S.C. 154(a)(2).

[21] Appl. No.: 08/695,425

[22] Filed: Aug. 12, 1996

[51] Int. Cl.[7] ................................................ F16L 21/00
[52] U.S. Cl. ...................... 285/369; 285/404; 285/154.3; 285/151.1; 285/379
[58] Field of Search ................................. 285/369, 404, 285/154.3, 151.1, 379, 403

[56] References Cited

U.S. PATENT DOCUMENTS

| | | | |
|---|---|---|---|
| 2,986,409 | 5/1961 | Weber | 285/154.3 |
| 3,517,951 | 6/1970 | Dunmire | 285/369 |
| 3,951,436 | 4/1976 | Hyde, Jr. | 285/404 |
| 3,963,268 | 6/1976 | Widdcombe | 285/369 |
| 4,438,954 | 3/1984 | Hattori | 285/404 |
| 4,549,755 | 10/1985 | Kot et al. | 285/151.1 |
| 4,819,974 | 4/1989 | Zeidler | 285/404 |
| 4,835,342 | 5/1989 | Guginsky | 285/151.1 |
| 5,165,735 | 11/1992 | Nardi et al. | |
| 5,647,613 | 7/1997 | Marik et al. | 285/154.3 |

*Primary Examiner*—Eric K. Nicholson
*Attorney, Agent, or Firm*—Howard C. Miskin

[57] ABSTRACT

Electrical conduit coupling devices are disclosed that include a casing formed of a steel tubing that, in turn, includes a rear portion and a front portion, an elastomeric "O" ring secured at the front portion by a retainer and an end cap. The electrical conduit coupling devices further include a clamp that is arcuate in shape, and in one embodiment, has ends separated from each other to form a gap therebetween which is diametrically located opposite a cut-out in the central region of the clamp. The cut-out cooperates with the separated ends to allow the clamp to clamp around a conduit that is inserted into the electrical conduit coupling device. The electrical conduit coupling devices provide for not only rigid connection to a conduit, but also a waterseal or concrete seal connection therebetween.

17 Claims, 6 Drawing Sheets

ELECTRICAL FITTING FOR CONDUIT CONNECTION

BACKGROUND OF THE INVENTION

The present invention relates generally to improvements in fittings for conduits, such as pipes, tubes, ducts and the like and, more particularly, to an improved conduit fitting particularly suited for providing waterproof connections of conduits and for securing a conduit to a wall of an electrical panel or some other application.

In the transmission of electrical power or signals, it is a convenient practice to house the electrical transmission wires or cables in plastic or thin metal conduits. Since electrical cables are generally longer than the lengths of the housing conduit sections and the cables terminate at a junction box of an electrical panel, it is typically necessary to firmly connect the proximate ends of successive conduit sections to each other and to firmly connect the terminal end of the joined conduits to a wall of the junction box through an opening therein through which the cables pass. Moreover, the conduit connections, as well as the conduit junction box connection, should be of a hermetically sealed nature. An electrical fitting for conduit connections that serves these needs is described in U.S. Pat. No. 5,165,735 ('735), issued Nov. 24, 1992 and is herein incorporated by reference.

The electrical fitting of the '735 patent serves well its intended purpose, but it is desired that further improvements be provided thereto. More particularly, it is desired that the clamp member for clamping the electrical fitting to the conduit housing the cables be more easily positioned within the electrical fitting, yet provide for a rigorous connection between the electrical fitting and the conduit. Furthermore, it is desired that the hermetically sealing means be provided that is more readily usable by the installer, thereby, reducing the time consumed for connecting the conduit to and from its selected junction points.

SUMMARY OF THE INVENTION

It is a principle object of the present invention to provide an improved conduit fitting.

Another object of the present invention is to provide an improved fitting for cables being carried by conduits.

Still another object of the present invention is to provide an improved conduit fitting that provides waterproof connections between successive sections of electrical conduits.

A still further object of the present invention is to provide a compression fitting that is water-tight/concrete-tight and leakproof and yet is easily and faster to install, but also secure when so installed.

Still further, an object of the present invention is to provide a device of the above nature characterized by its high reliability, convenience in use, low in cost, and having versatility and adaptability.

The above and other objects of the present invention will become apparent from the reading of the following description taken in conjunction with the accompanying drawings which illustrate preferred embodiments thereof.

A conduit fitting in accordance with the present invention comprises a tubular casing having a tapped radial bore housed in the casing. Also housed in the casing is a movable arcuate clamp member arranged to be coaxial with the casing and that is engaged by a screw member extending out of a tapped bore and bearing on the clamp member. Advantageously, the clamp member has ends that are circumferentially separated from each other, and in one embodiment, form a gap therebetween that is diametrically located opposite from a cut-out in the central region of the clamp member, with the gap and cut-out cooperating with each to act as means so that the separated ends move toward each other as the screw member engages and bears on the clamp member to move the clamp member from a retracted to a contracted position. In the other embodiment, a cut-out is not provided and the clamp member also responds to the engagement of the screw member.

In its preferred form, the casing is formed from steel tubing and includes a rear portion and a front portion, a cold flow or elastomeric "O" ring secured at the front portion by a retainer and an end cap. The rear portion is located inward from a dimple that serves as a stop for a conduit that may be inserted thereto. When the conduit fitting is used as conduit section coupler, a second clamp device coaxial with and a mirror image of the first device is integrally formed therewith. When used as a connector to connect the conduit to a junction box wall or the like, the tubular casing front section is externally threaded and engaged by a locked nut.

The improved integral coupler is simple, reliable and inexpensive, and yet is secured to a conduit merely by inserting the conduit through the rear opening of the second coupler or the front opening of the first coupler with the clamps thereof in their retracted position and then advancing the conduit into full snug engagement with the casing rear or casing front portion and tightening the screw member to tightly clamp about the conduit. The "O" ring at each of the rear portion of the second coupler and at the front portion of the first coupler provide compression fittings that seal the joined conduit from water or other liquids, such as flowing cement. The device is, moreover, of great versatility and adaptability.

DESCRIPTION OF THE PREFERRED EMBODIMENTS

Figure 1:
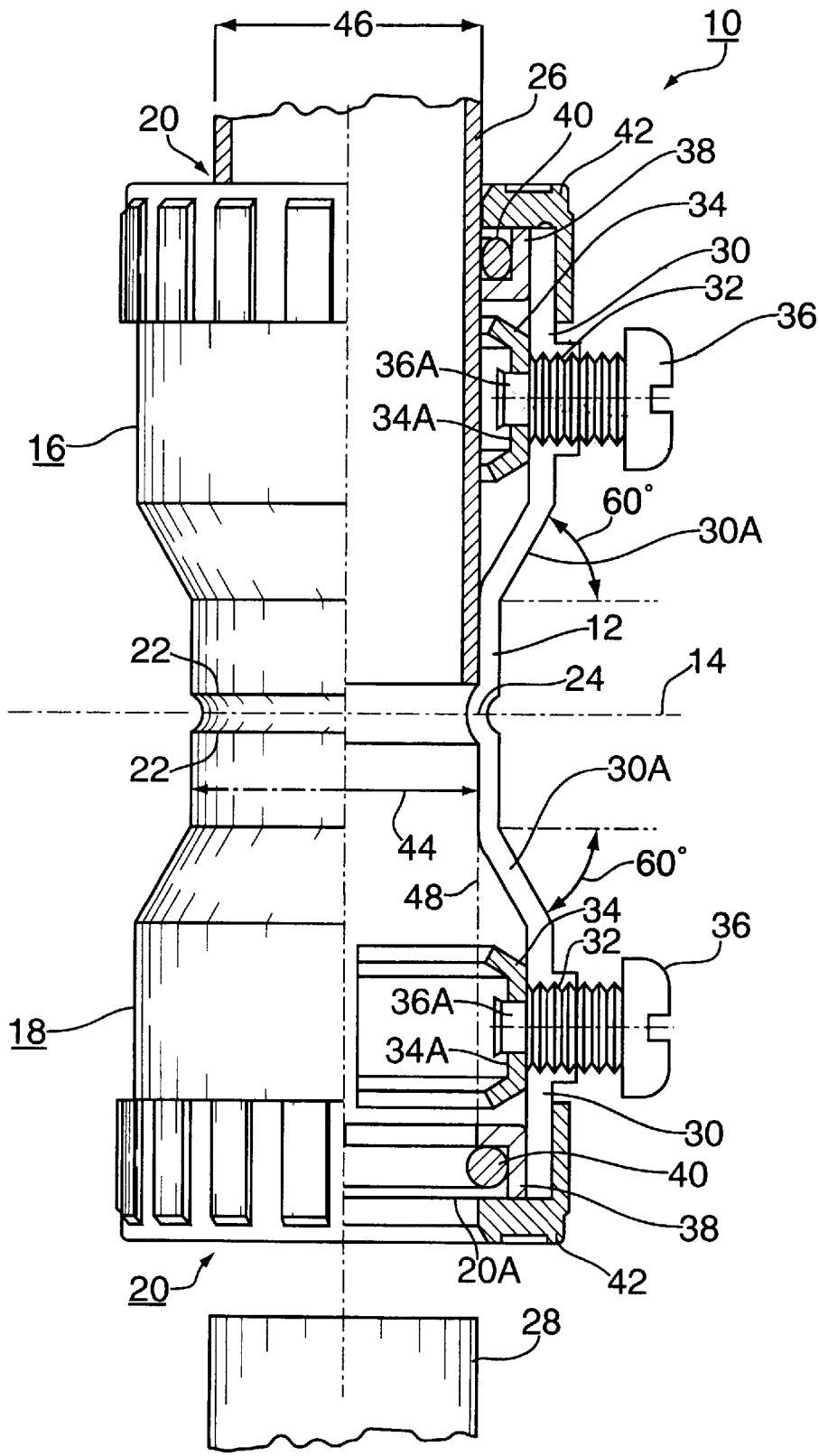
FIG. 1 is a front elevation view, shown partially in section, of a coupling device embodying the principles of the present invention for connecting a pair of conduit sections.

Referring now to the drawings, wherein the same reference numbers indicate the same elements throughout, there is shown in FIG. 1 a front elevation view of an electrical fitting 10 having an overall body 12 preferably formed of a metal or plastic material. The overall body 12 is symmetrical about a transverse plane 14 so as to define an integrally formed pair of coaxial end-to-end tubular casings 16 and 18 which are preferably mirror images of each other. Although the overall body 12 of FIG. 1 illustrates two tubular casings 16 and 18, the practice of the present invention contemplates the use of a body 12 forming a single casing, such as the tubular casing 16 or 18.

Each of the tubular casings 16 and 18 has a front portion 20, which has an entrance section 20A, and a rear portion 22. As illustrated in the sectional portion of FIG. 1, the rear portions 22 are defined by an angular ridge 24 integrally formed on the inside face of the body 12 and located forwardly of each of the rear sections 22, thereof, and defining a conduit stop, such as that shown for the casing 16 which is shown in the upper section of FIG. 1 as being attached to a first conduit section 26. Conversely, the casing 18 is shown in the lower section of FIG. 1 as being unattached to but ready to accept a second conduit section 28.

The overall body 12 has a radially outwardly projecting tubular section 30 for each of the casings 16 and 18 having portions 30A preferably with sloped regions defined by a 60° angle (as shown in FIG. 1). Each tubular section 30 of casings 16 and 18 has a tapped and threaded inside bore 32 defining a threaded radial bore. Each of the casings 16 and 18 also has a clamp member 34 with an opening 34A, a screwing member 36 having a threaded shank and a projecting end 36A which is inserted into and held in within the opening 34A, a compressive gasket retainer 38, a compressible gasket 40, and an end cap 42. Further, each of the casings 16 and 18, at the rear portion thereof, has an inner diameter 44, whereas the entrance portion 20 thereof has an inner diameter which is greater than the diameter 46 of the conduits 26 and 28. Further, as seen for casing 18, the compressible gasket 40 is positioned by the retainer 38 so that its diameter extends pass, as identified by dimensional line 48, the inner diameter 44. Further, as seen for casing 16, the compressible gasket 40, when held by retainer 38, has an inside diameter defining its stressed condition which is somewhat greater than the inside diameter of the casing 16 so that compressible gasket 40 presses against the outer diameter of conduit 26 and forms a compression fitting therebetween. The conduit 26 is rigidly and mechanically clamped by the clamp 34, which may be further described with reference to FIG. 2.

Figures 2, 2A, 2B:
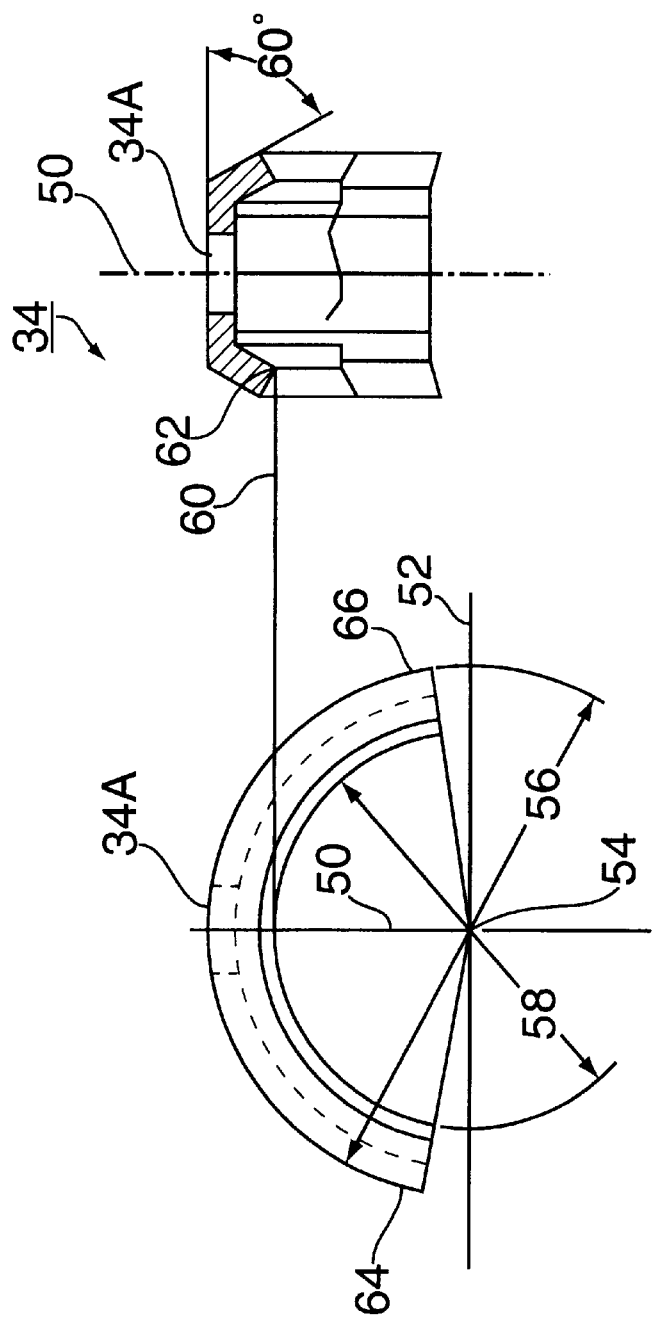
FIG. 2 is composed of FIGS. 2(A) and 2(B) that cumulatively illustrate the clamp member shown in FIG. 1.

FIG. 2 illustrates the clamp member 34 which is preferably comprised of a cold-rolled steel material having an electro-zinc finish, both known in the art. FIG. 2 is composed of FIGS. 2(A) and 2(B), wherein FIG. 2(A) illustrates the arcuate shaped features of the clamp 34, and FIG. 2(B) illustrates the mechanical and structural features of the clamp 34.

As seen in FIG. 2(A), the arcuate clamp 34 has axes 50 and 52 whose intersection thereof defines an origin 54. The clamp 34 has an overall diameter 56 and an inner diameter 58 having an associated dimensional line 60 which defines a location 62 of FIG. 2(B) corresponding to the inner edge of an outer wall of the clamp member 34. The clamp member 34 has opposite ends 64 and 66 that are circumferentially separated from each other as shown in FIG. 2(A). The inner diameter 58 of clamp 34 is selected to be somewhat larger than the outer diameter of a typical conduit, such as conduit 26, so that the conduit may be easily inserted into the region defined by the inner diameter 58 for subsequent clamping thereabout.

Figures 3, 3A, 3B:
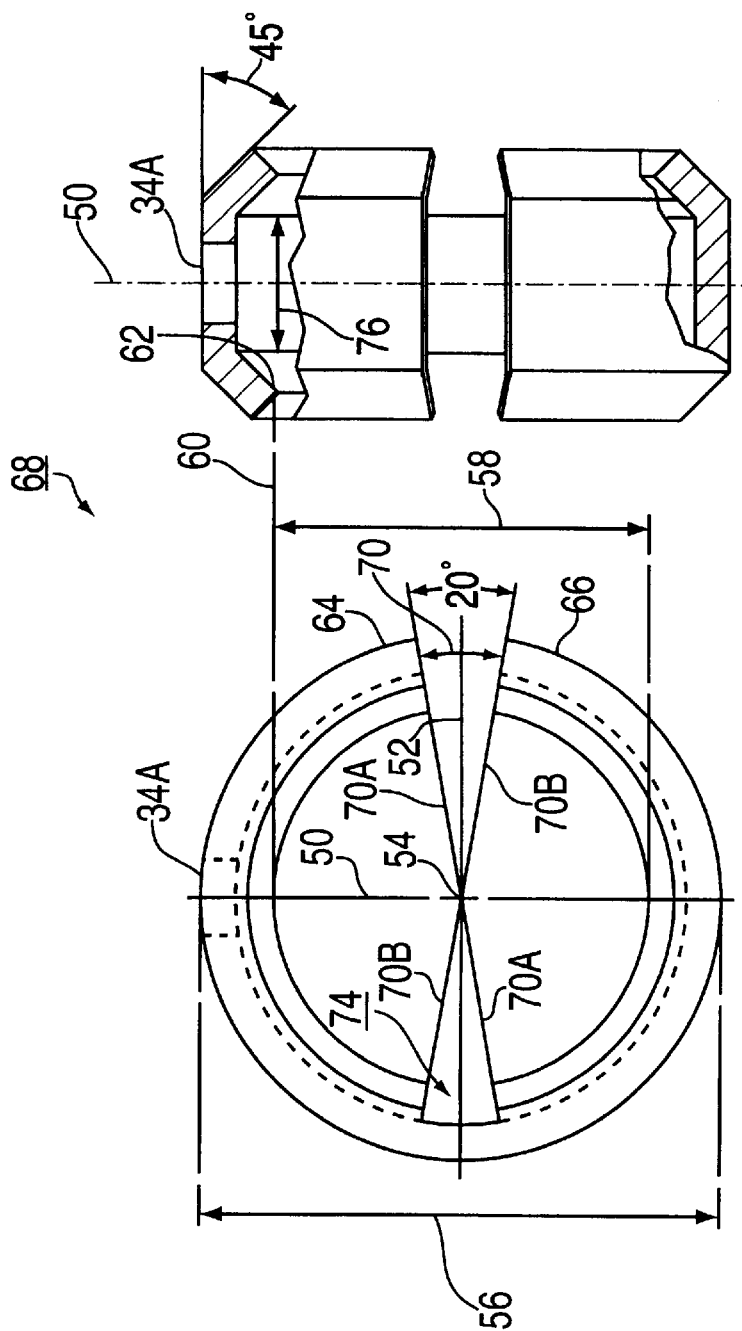
FIG. 3 is composed of FIGS. 3(A) and 3(B) that cumulatively illustrate an alternate embodiment of a clamp member.

An alternate embodiment for a clamp 68 of the present invention may be further described with reference to FIG. 3 which is composed of FIGS. 3(A) and 3(B) illustrating similar features of those shown in FIGS. 2(A) and 2(B) respectively. Clamp 68 is preferably comprised of the same material as clamp 34 and also has the same finish thereof. Conversely, the clamp 68 of FIG. 3 covers a circumferential distance which is about twice that of clamp 34 of FIG. 2. Furthermore, clamp 68 has an edge with a preferred angle of 45° (see FIG. 3(B)), whereas clamp 34 has an edge with a preferred angle of 60° (see FIG. 2(B)). However, the clamps 34 and 68 have similar features which are identified by identical reference numbers.

As also seen in FIG. 3(A), the arcuate clamp 68 has ends 64 and 66 that are separated from each other to form a gap 70 therebetween. The gap 70 corresponds to a circumferential arc of 20°, defined by dimensional lines 70A and 70B originating from origin 54, as shown in FIG. 2(A).

As still further seen in FIG. 3(A), the arcuate clamp 68 has a cut-out 74 which is also defined by the dimensional lines 70A and 70B. As seen in FIG. 3(B), the arcuate clamp 68 has an internal channel 76. The cut-out 74 of FIG. 3(A) is located in the central region of clamp 68 and is further located so as to be diametrically opposite to the gap 70. The cut-out 74 and gap 70 cooperate with each other to allow the clamp 68 to be moved from its retracted to its contracted position. More particularly, the cut-out 74 and the gap 70 cooperate with each other so that the ends 64 and 66 are allowed to move toward or away from each other in response to movement of the screw 36 bearing down on the clamp 68. Similarly, the ends 64 and 66 of the clamp 34 of FIG. 2 move toward or away from each other in response to movement of the screw 36 bearing down on the clamp 34.

In operation, and in a manner as to be more fully described, the cut-out 74 cooperates with the separated ends 64 and 66 so that when screw 36 is screwed down, the movement of the threaded shank of screw 36 in the threads 32 of the extension 30, causes the screw 36 to bear on the clamp 68 which, in turn, causes the ends 64 and 66 to be moved between their retracted and contracted positions. Similarly, the movement of the threaded shank of screw 36 in the threads 32 of the extension 30, causes the screw 36 to bear on the clamp 34 which, in turn, causes the ends 64 and 66 of clamp 34 to be moved between their retracted and contracted positions. The clamp 34, shown in FIG. 1, responds to the clamping force created by the screw member 36.

As most clearly seen with reference to the cross-sectional portion of casing 16 shown in FIG. 1, the screw 36 has a shank with threads that mate with the internal threads 32 of the radial bore of the projected tubular section 30 so that when the screw 36 is rotated, screw 36 bears down against the clamp 34 of FIG. 2, which, in turn, causes the slight bending of clamp 34 so that it seizes and clamps about the conduit 26. In addition, the clamp 34 engagement of the conduit 26 forces the conduit 26 against the inner wall of the casing 16 to further increase the engagement therebetween. The clamp 68 of FIG. 3 operates in a manner similar to clamp 34 when used in lieu thereof, but encounters more bending than clamp 34 and has an almost complete circumferential seizing, engaging, and clamping of the conduit 26. As further seen in FIG. 1, the end 36A of screw 36 inserted into and confined by the opening 34A also confines the movement of screw 36 relative to clamp 34. This confinement of screw 36 is equally applicable to clamp 68. Accordingly, unlike the prior art device disclosed in U.S. Pat. No. 5,165,735, the clamps 34 and 68 and screw 36 are moved and locatable in unison so that the clamps 34 and 68 may be more easily positionable and operable so as to be clamped about conduit 26. The conduit 26 is also provided with a water-seal, or concrete-tight seal accomplished, in part, by the retainer 38 which may be further described with reference to FIG. 4.

Figure 4:
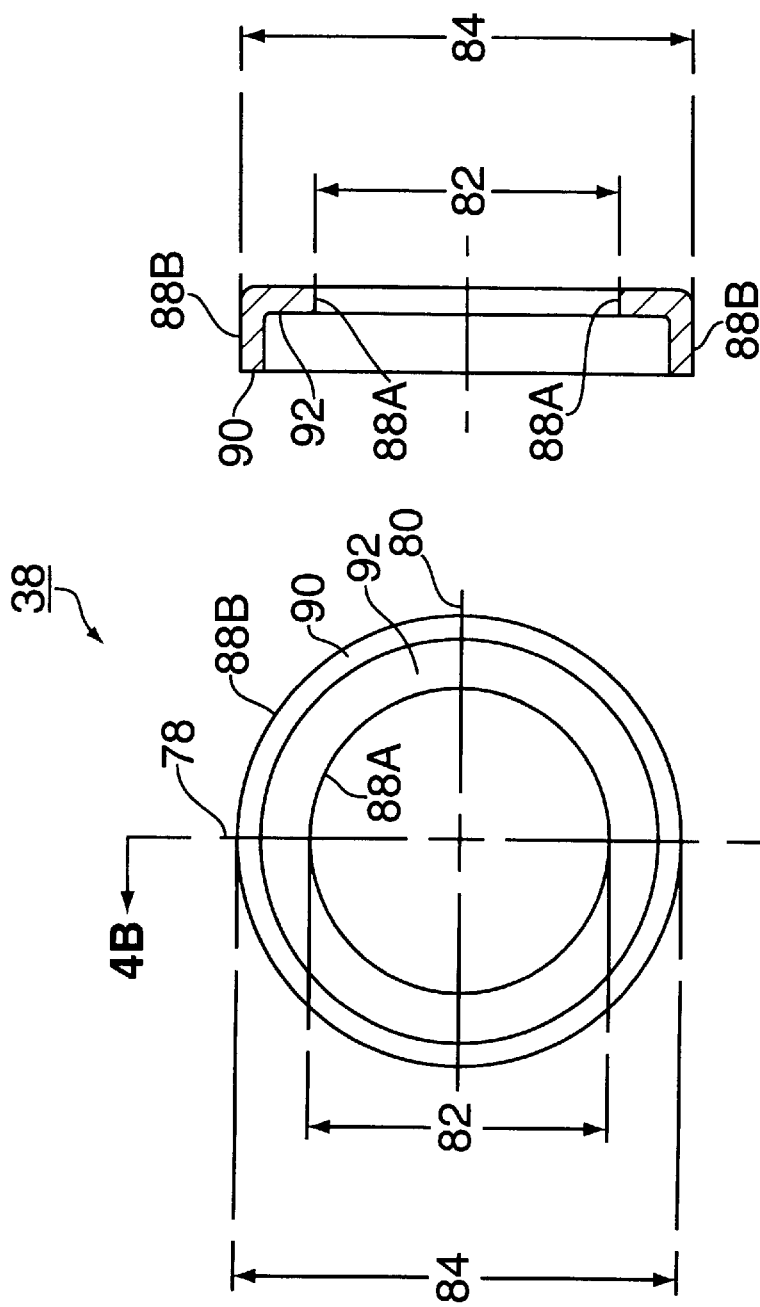
FIG. 4 is composed of FIGS. 4(A) and 4(B) that cumulatively illustrate the compressible gasket retainer shown in FIG. 1.

FIG. 4 is composed of FIGS. 4(A) and 4(B), wherein FIG. 4(B) is taken along line 4B—4B of FIG. 4(A). The retainer 38 is preferably of a metallic material having an electro-zinc plate coating. As seen in FIG. 4(A), the retainer 38 has axes 78 and 80 as well as an inner diameter 82 and an outer diameter 84. The inner diameter 82 defines an inner surface 88B, whereas the outer diameter 84 defines an outer surface 88B. Located between surfaces 88A and 88B are a rim 90 and a ledge 92, shown in both FIGS. 4(A) and 4(B). The ledge 92 is dimensioned so as to accept and allow the compressible gasket 40 to lie thereon, as shown in FIG. 1.

The compressible gasket 40 has dimensions that are selected so as to be complementary relative to the retainer 38 and so that the compressible gasket 40 sits in and is held in position by ledge 92 of retainer 38 and forms a compressible fitting when in contact with conduits, such as conduit 26 or 28. The compressible gasket 40 is preferably of an "O" ring formed of an elastomeric material.

As seen in FIG. 1, and as previously described with reference to the casing 16, the "O" ring 40 when positioned in retainer 38 has an inside diameter defining its stress condition which is somewhat less than the inner diameter 44 of the casing 16. Conversely, the "O" ring 40 has an outer diameter defining its unstressed condition, which when positioned in the retainer 38, somewhat exceeds the inner diameter 91 of retainer 38, to form a snug fit therebetween. As further seen in FIG. 1, the "O" ring 40, as well as the retainer 38, is covered by the end cap 42 which may be further described with reference to FIG. 5.

Figure 5:
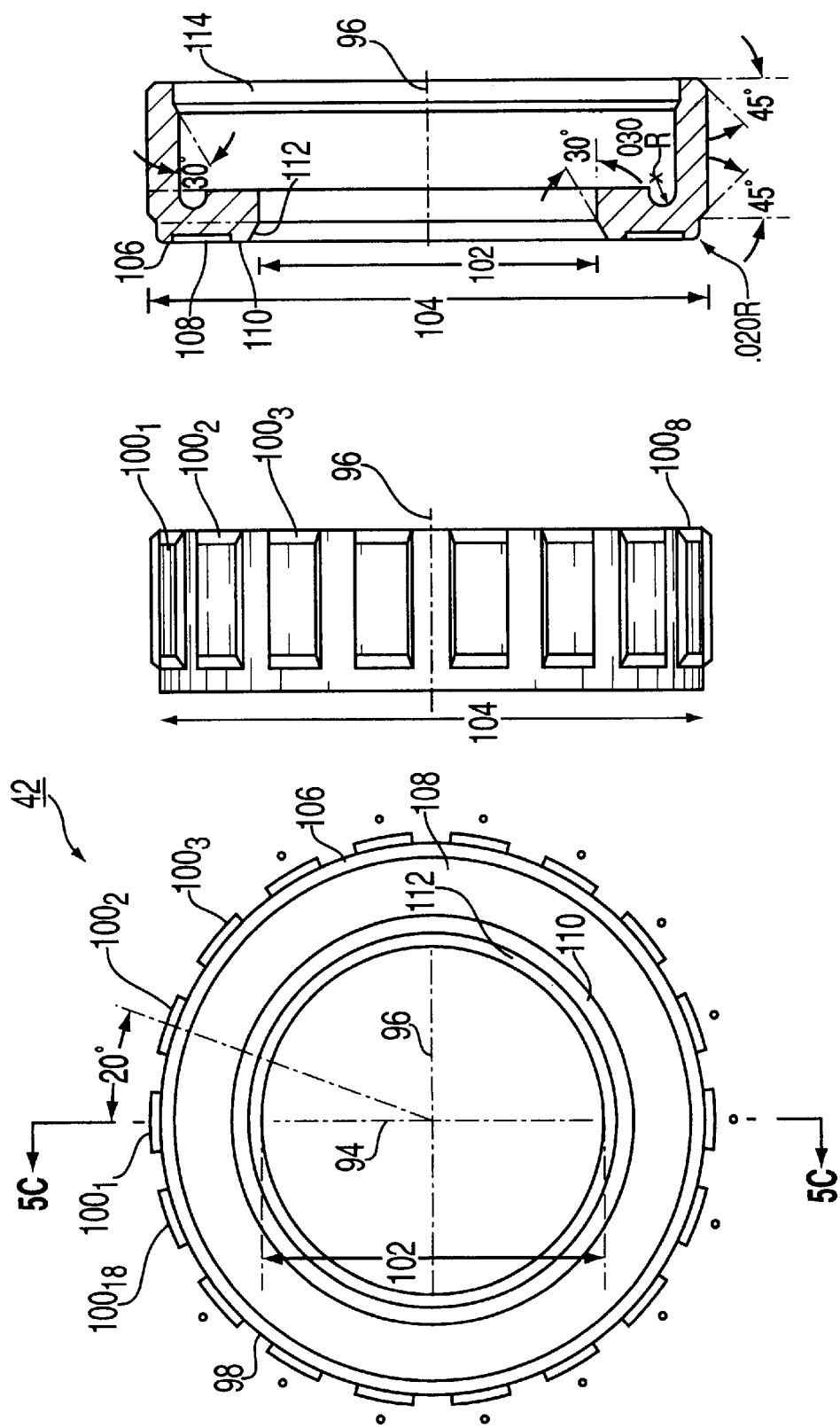
FIG. 5 is composed of FIGS. 5(A), 5(B) and 5(C) that cumulatively illustrate the end cap shown in FIG. 1.

FIG. 5 is composed of FIGS. 5(A), 5(B), and 5(C), wherein FIG. 5(C) is a view of FIG. 5(A), taken along line 5C—5C. FIGS. 5(A), 5(B), and 5(C), cumulatively illustrate the end cap 42 which preferably comprises a plastic material, such as that of DuPont Zytel. As seen in FIG. 5(A), the end cap 42 has axes 94 and 96 and an outer surface 98. The outer surface 98 has a plurality of ribs $100_1, 100_2, 100_3, \ldots 100_{18}$ that are spaced apart from each other by a predetermined distance, such as that corresponding to a 20° circumferential spacing, as shown in FIG. 5(A). The end cap 42 further has an inner diameter 102 and an outer diameter 104 shown most clearly in FIG. 5(B) which also shows the plurality of ribs $100_1 \ldots 100_{18}$. The inner diameter 102 defines a region that allows for the insertion on the end of a conduit, such as conduit 26 or 28.

As further seen in FIG. 5(A), the end cap 42 has surfaces 106, 108, 110, and 112 which are most clearly seen in FIG. 5(C). FIG. 5(C) also illustrates the end cap as having shape surfaces defined by the radii illustrated therein. The end cap 42 has a rear member 114 which, in cooperation with the regions cumulatively form by elements 106, 108, 110 and 112, confine the movement of end cap 42 so that it covers the retainer 38 and "O" ring 40. Further, the ribs $100_1 \ldots 100_{18}$ allow an installer to grip, move and position the electrical fitting 10 relative to the conduits 26 and 28, thereby, assisting the installer and allowing for a reduction in consumed time for providing a water-tight, or cement-tight compression fitting for the mating between the conduit 26 and/or 28 and the electrical fitting 10.

In operation, and with reference to FIG. 1, wherein casing 18 will be referred to as being in its non-connected state to a conduit, such as conduit 28, and wherein casing 16 will be referred to as being in its connected state to a conduit, such as conduit 26, the electrical conduit coupling device 10 having clamp 34 or clamp 68 connects to a pair of conduits 26 and 28, by first allowing clamp 34 or clamp 68 to be opened (retracted) by turning screw 36 to retract the screw 36 and the clamp 34 or clamp 68. The conduit, such as conduit 28, is then inserted into the front portion 20 of the casing 18 which, causes the "O" ring 40 to assume its squashed condition (see "O" ring 40 of casing 16). Further insertion of the conduit 28 causes conduit 28 to come into contact with the stop 24. The screw 36 is then tightened down to cause the clamp 34 or clamp 68 (see FIG. 2 or FIG. 3 wherein ends 64 and 66 are moved from their retracted position toward their contracted condition), to seek and obtain a tight gripping engagement with the conduit 28. Furthermore, the conduit 28 causes the exertion of a continuous outwardly radial pressure that is applied to the "O" ring 40 so as to effect a tight seal between the conduit 28 and "O" ring 40 and, thereby, effect a hermetic connection between the conduit 28 and the electrical conduit coupler 10. The final state of a connection of the conduit, such as conduit 26, to the electrical conduit coupler 10 is shown in FIG. 1 with reference to casing 16.

It should now be appreciated that the practice of the present invention provides for an electrical conduit coupler 10 for conduit connections that not only rigidly connects together successive sections of conduits, but also provides a compression fitting that is waterproof and cement proof and is easy and fast to install.

A second embodiment of the present invention for coupling an electrical conduit to an electrical panel, may be further described with reference to FIG. 6.

Figure 6:
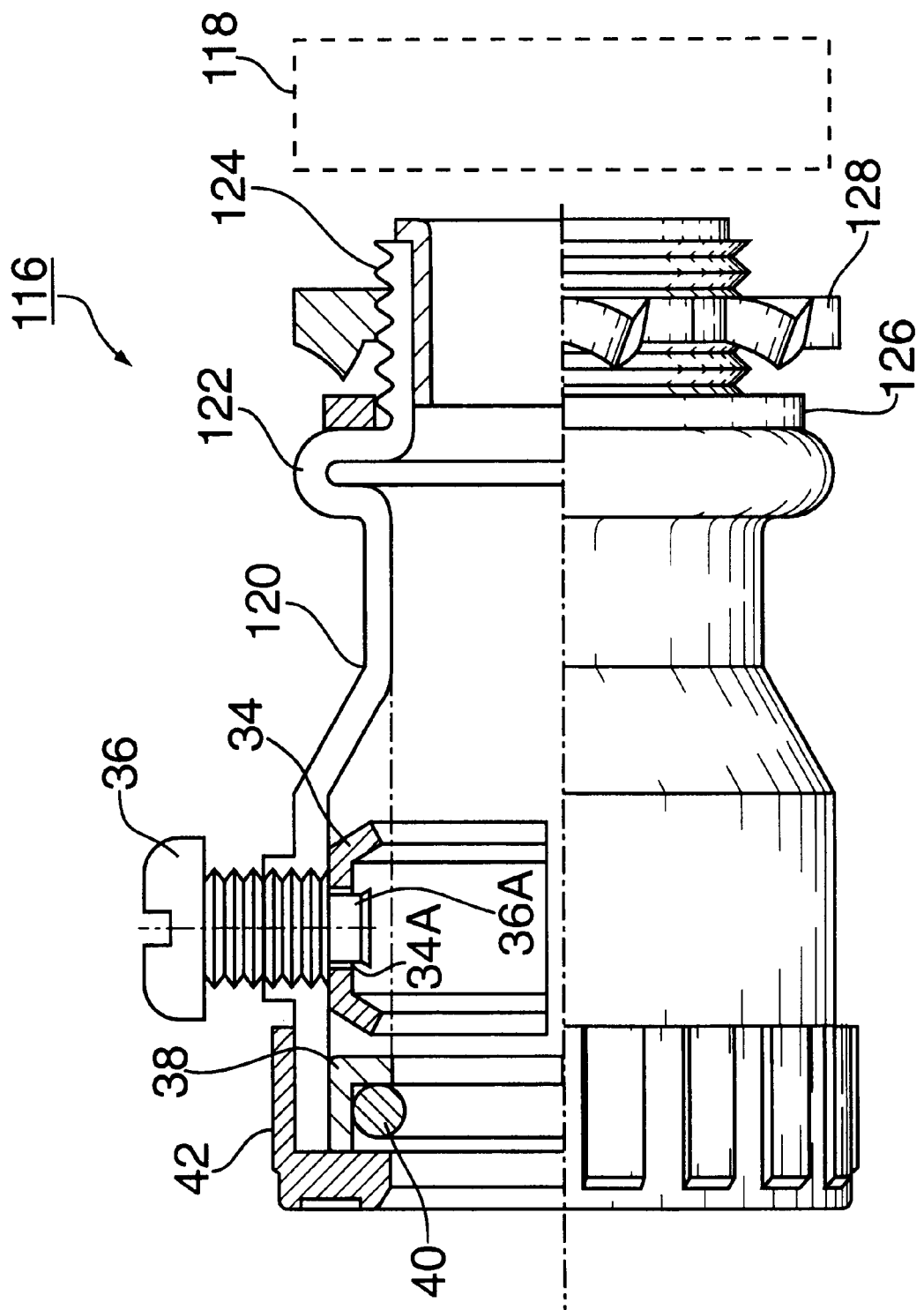
FIG. 6 is a front elevation view, shown partially in section, of a coupling device of another embodiment of the present invention.

FIG. 6 illustrates an electrical fitting 116 for mating the terminal end of a conduit (not shown) to an electrical panel 118, shown in phantom. The electrical panel 118 may be any type of junction box so long as it has an opening to allow for the insertion of and attachment to the electrical fitting 116. The electrical fitting 116 of FIG. 6 is quite similar to the electrical fitting 10 of FIGS. 1–5, with the exception that the electrical fitting 116 has a body 120 having a front portion that mates with the electrical panel 118 and a rear portion that carries the retainer 38, "O" ring 40 and end cap 40 and that mates with a conduit (not shown), such as conduit 26 or 28. FIG. 6 illustrates the electrical fitting 116 as having clamp 34, but clamp 68 may be equally utilized therein. The front section of electrical fitting 116 has a radially outwardly projecting ridge 122 and a connection section 124 both of which are coaxial with the body 120. The connecting section 124 is threaded and is capable of accepting an elastomeric gasket 126 and a lock nut 128 both of which are also capable of being accepted by the electrical panel 118.

In operation, and with reference to FIG. 6, the electrical fitting 116 is mounted to the wall of the electrical panel 118, or the like, by removing lock nut 128, inserting the connection section 124 into a matching opening in the mounting wall of the electrical panel 118, and then applying and tightening the lock nut 128 so as to firmly secure the electrical fitting 116 to the mounting wall of the electrical panel 118. Thereafter, or even before, a conduit, such as conduit 26 or 28 of FIG. 1, is inserted through the casing of the body 120 and firmly clamped in position in a manner as earlier described with reference to FIG. 1. Upon the completion of the mating of the electrical fitting 116 to the electrical panel 118, the terminal ends of the cables being carried by the conduit 26 or 28 may be electrically connected to the electrical panel 118.

It should now be appreciated that the practice of the present invention provides for an electrical fitting that is easily connected to an electrical panel allowing the terminal end of a conduit carrying electrical wires to be interconnected to the associated components of the electrical panel 118.

While there have been described and illustrated preferred embodiments of the present invention, it is apparent that numerous changes, omissions and additions may be made without departing from the spirit thereof.

What I claim is:

1. A device for coupling at least one electrical conduit comprising:
   a first casing including a tubular wall having a threaded radial bore therein and front and rear portions with the front portion having an entrance section;
   a first clamp member housed in said first casing and being movable between retracted and contracted positions;
   a first screw member threadedly engaging said threaded bore of said first casing and engaging said first clamp member;
   a first retainer mounted on said entrance section of said front portion of said first casing and extending into the interior of said casing;
   a first compressible gasket having complementary dimensions relative to said first retainer so as to be held in said first retainer, said first gasket being compressible by said electrical conduit positioned within said casing; and
   a first end cap mounted on said casing and positioned over said first retainer for blocking said first compressible gasket between said retainer and said end cap.

2. The device according to claim 1, wherein said first casing includes a radially outwardly projection tubular section having a threaded inside face defining said threaded radial bore.

3. The device according to claim 1, wherein said rear portion has a diameter which exceeds that of said front portion.

4. The device according to claim 1 further including an annular ridge integrally formed on the inside face of said first casing forwardly of the rear portion thereof and defining a conduit stop.

5. The device according to claim 1, wherein said first compressible gasket is an "O" ring formed of an elastomeric material.

6. The device according to claim 5, wherein said casing has an inside diameter and said "O" ring when held by said first retainer has an outside diameter defining its stressed condition which is somewhat greater than the inside diameter of said retainer.

7. The device according to claim 1, wherein said first end cap has an outer surface having a plurality of ribs that are circumferentially spaced apart from each other by a predetermined distance.

8. The device according to claim 1, wherein said first clamp is arcuate in shape and has ends that are separated from each other to form a gap therebetween and being movable between said retracted and contracted positions by means of a cut-out in the central region of said arcuate first clamp member which is located diametrically opposite to and cooperates with said gap.

9. The device according to claim 1, wherein said first clamp is arcuate in shape and has ends circumferentially separated from each other.

10. The device according to claim 1 further comprising:
    a second casing including a tubular wall having a threaded radial bore therein and front and rear portions with the front portion having an entrance section;
    said rear portion axially connected to the rear portion of said first casing; said first and second casing being coaxial;
    a second clamp member housed in said second casing and being movable between retracted and contracted positions;
    a second screw member threadedly engaging said threaded bore of said second casing and engaging said second clamp member;
    a second retainer mounted on said entrance section of said front portion of said second casing and extending into the interior of said casing;
    a second compressible gasket held in said second retainer, said second gasket being compressible by said electrical conduit positioned within said conduit; and
    a second end cap mounted on said casing and positioned over said second retainer for blocking said second compressible gasket between said retainer and said end cap.

11. A device for coupling an electrical conduit to an electrical panel comprising:
    a casing including a tubular wall having a threaded radial bore therein and having a front portion and a rear portion with an entrance section, said entrance section having a radially outwardly projecting ridge and a connecting section coaxial with said casing, said connecting section being threaded and capable of being accepted by the electrical panel;
    a clamp member housed in said casing and being movable between retracted and contracted positions;
    a screw member threadedly engaging said threaded bore of said casing and engaging said clamp member;
    a retainer mounted on said entrance section of said rear portion of said casing and extending interiorly in said casing;
    a compressible gasket having complementary dimensions relative to said retainer so as to be held in said retainer, said gasket being compressible by said electrical conduit; and
    an end cap mounted on said casing and positioned over said retainer for blocking said compressible gasket between said retainer and said end cap.

12. The device according to claim 11, wherein said connecting section is capable of accepting an elastomeric gasket and a lock nut.

13. The device according to claim 11, wherein said compressible gasket is an "O" ring formed of an elastomeric material.

14. The device according to claim 13, wherein said casing has an inside diameter and first "O" ring, when held by said retainer, has an outside diameter defining its stressed condition which is somewhat greater than the inside diameter of said retainer.

15. The device according to claim 11, wherein said end cap has an outer surface having a plurality of ribs that are circumferentially spaced apart from each other by a predetermined distance.

16. The device according to claim 11, wherein said clamp is arcuate in shape and has ends circumferentially separated from each other.

17. The device according to claim 11, wherein said clamp is arcuate in shape and has ends that are separated from each other to form a gap therebetween and being movable between said retracted and contracted positions by means of a cut-out in the central region of said arcuate first clamp member which is located diametrically opposite to and cooperates with said gap.

* * * * *